US008218021B2

(12) United States Patent
Terayama

(10) Patent No.: US 8,218,021 B2
(45) Date of Patent: Jul. 10, 2012

(54) IMAGE CAPTURE APPARATUS, METHOD OF CONTROLLING THE SAME, AND PROGRAM

(75) Inventor: Kota Terayama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 317 days.

(21) Appl. No.: 12/684,398

(22) Filed: Jan. 8, 2010

(65) Prior Publication Data
US 2010/0194916 A1 Aug. 5, 2010

(30) Foreign Application Priority Data

Feb. 3, 2009 (JP) ................................. 2009-022964
Dec. 11, 2009 (JP) ................................. 2009-282224

(51) Int. Cl.
H04N 5/225 (2006.01)
H04N 5/228 (2006.01)
H04N 5/235 (2006.01)
H04N 9/68 (2006.01)
H04N 5/262 (2006.01)
G06K 9/00 (2006.01)
G06K 9/36 (2006.01)
G06K 9/40 (2006.01)
G06K 9/32 (2006.01)

(52) U.S. Cl. ................ 348/218.1; 348/222.1; 348/229.1; 348/234; 348/235; 348/237; 348/239; 362/162; 362/166; 362/167; 362/254; 362/284; 362/294

(58) Field of Classification Search .............. 348/207.99, 348/207.1, 218.1, 222.1–223.1, 229.1, 234, 348/235, 237, 239–251; 382/162, 166–167, 382/254–275, 284, 294
See application file for complete search history.

(56) References Cited

U.S. PATENT DOCUMENTS 6,631,216 B2  10/2003 Hieda et al.
6,754,398 B1   6/2004 Yamada
(Continued)

FOREIGN PATENT DOCUMENTS

EP  2003612 A  12/2008
(Continued)

OTHER PUBLICATIONS

The above references were cited in a Jul. 18, 2011 European Search Report which is enclosed of the counterpart European Patent Application No. 10150118.7.

Primary Examiner — Jason Chan
Assistant Examiner — Michael Osinski
(74) Attorney, Agent, or Firm — Cowan, Liebowitz & Latman, P.C.

(57) ABSTRACT

An apparatus includes an image capture unit which includes an image sensor in which pixels for photoelectrically converting an object image are two-dimensionally arrayed in correspondence with color filters of a plurality of colors, and generates an image signal, a reducing unit which reduces the image signal output from the image capture unit to generate a reduced image, an image processing unit which performs development processing for the reduced image to obtain a first developed image containing luminance components and color difference components and performs development for the image signal output from the image capture unit to obtain a second developed image containing luminance and color difference components, an enlargement unit which enlarges the first developed image to the same size as that of the second developed image, and a composition unit which performs composition of the second developed image and an enlarged image.

10 Claims, 7 Drawing Sheets

U.S. PATENT DOCUMENTS

| | | | |
|---|---|---|---|
| 6,807,319 B2 * | 10/2004 | Kovvuri et al. | 382/275 |
| 7,286,701 B2 * | 10/2007 | Muraki | 382/167 |
| 7,755,670 B2 * | 7/2010 | Utagawa | 348/222.1 |
| 7,956,907 B2 * | 6/2011 | Tanizoe et al. | 348/240.2 |
| 8,031,935 B2 * | 10/2011 | Shiraishi | 382/163 |
| 2003/0112863 A1 | 6/2003 | Demos | 375/240.01 |
| 2003/0158608 A1 | 8/2003 | Ishikawa et al. | 700/2 |
| 2003/0219156 A1 * | 11/2003 | Muraki | 382/167 |
| 2004/0160525 A1 * | 8/2004 | Kingetsu et al. | 348/364 |
| 2005/0068425 A1 * | 3/2005 | Matsutani | 348/222.1 |
| 2006/0164520 A1 * | 7/2006 | Onomura | 348/222.1 |
| 2006/0245008 A1 * | 11/2006 | Kohashi | 358/463 |
| 2006/0290791 A1 * | 12/2006 | Takane | 348/231.99 |
| 2007/0127095 A1 * | 6/2007 | Sugimori | 358/520 |
| 2007/0216951 A1 * | 9/2007 | Shiraishi | 358/3.04 |
| 2007/0257997 A1 | 11/2007 | Tanizoe | |
| 2008/0049119 A1 * | 2/2008 | Yamamoto | 348/223.1 |
| 2008/0049124 A1 * | 2/2008 | Tanizoe et al. | 348/240.99 |

FOREIGN PATENT DOCUMENTS

| | | |
|---|---|---|
| JP | 11-041491 A | 2/1999 |
| JP | 11-053531 A | 2/1999 |
| JP | 2001-057677 A | 2/2001 |
| JP | 2007-329905 A | 12/2007 |

* cited by examiner

FIG. 5

| IMAGE CAPTURING SENSITIVITY | LUMINANCE COMPONENT | | COLOR DIFFERENCE COMPONENT | |
|---|---|---|---|---|
| | DIRECT YUV | ENLARGED YUV | DIRECT YUV | ENLARGED YUV |
| ISO 100 | 1.0 | 0.0 | 1.0 | 0.0 |
| ISO 200 | 1.0 | 0.0 | 1.0 | 0.0 |
| ISO 400 | 0.9 | 0.1 | 0.5 | 0.5 |
| ISO 800 | 0.8 | 0.2 | 0.4 | 0.6 |
| ISO 1600 | 0.7 | 0.3 | 0.3 | 0.7 |

TABLE OF GAIN SET VALUES FOR YUV SIGNALS OF TWO IMAGES BEFORE COMPOSITION

FIG. 6A

R-G LINE 1/3 REDUCTION

BEFORE REDUCTION: $R_1$ | $G_1$ | $R_2$ | $G_2$ | $R_3$ | $G_3$ | $R_4$ | $G_4$ | $R_5$ | $G_5$ | $R_6$ | $G_6$ | $R_7$ | $G_7$ $R'_1$ | $G'_1$ | $R'_2$ | $G'_2$ $R'_1 = (R_1 + 2 \times R_2 + R_3)/4$   $R'_2 = (R_4 + 2 \times R_5 + R_6)/4$
$G'_1 = (G_2 + 2 \times G_3 + G_4)/4$   $G'_2 = (G_5 + 2 \times G_6 + G_7)/4$

AFTER REDUCTION: $R'_1$ | $G'_1$ | $R'_2$ | $G'_2$

FIG. 6B

G-B LINE 1/3 REDUCTION

BEFORE REDUCTION: $G_1$ | $B_1$ | $G_2$ | $B_2$ | $G_3$ | $B_3$ | $G_4$ | $B_4$ | $G_5$ | $B_5$ | $G_6$ | $B_6$ | $G_7$ | $B_7$ $G'_1$ | $B'_1$ | $G'_2$ | $B'_2$ $G'_1 = (G_1 + 2 \times G_2 + G_3)/4$   $G'_2 = (G_4 + 2 \times G_5 + G_6)/4$
$B'_1 = (B_2 + 2 \times B_3 + B_4)/4$   $B'_2 = (B_5 + 2 \times B_6 + B_7)/4$

AFTER REDUCTION: $G'_1$ | $B'_1$ | $G'_2$ | $B'_2$

FIG. 6C

R-G LINE 1/6 REDUCTION

BEFORE REDUCTION: R₁ G₁ R₂ G₂ R₃ G₃ R₄ G₄ R₅ G₅ R₆ G₆ R₇ G₇ R₈ G₈ R₉ G₉ R₁₀ G₁₀ R₁₁ G₁₁ R₁₂ G₁₂

$R'_1 = (R_1 + 4 \times R_2 + 6 \times R_3 + 4 \times R_4 + R_5)/16$ $G'_1 = (G_3 + 4 \times G_4 + 6 \times G_5 + 4 \times G_6 + G_7)/16$ $R'_2 = (R_6 + 4 \times R_7 + 6 \times R_8 + 4 \times R_9 + R_{10})/16$ $G'_2 = (G_8 + 4 \times G_9 + 6 \times G_{10} + 4 \times G_{11} + G_{12})/16$

AFTER REDUCTION: R'₁ G'₁ R'₂ G'₂

FIG. 6D

G-B LINE 1/6 REDUCTION

BEFORE REDUCTION: G₁ B₁ G₂ B₂ G₃ B₃ G₄ B₄ G₅ B₅ G₆ B₆ G₇ B₇ G₈ B₈ G₉ B₉ G₁₀ B₁₀ G₁₁ B₁₁ G₁₂ B₁₂

$G'_1 = (G_1 + 4 \times G_2 + 6 \times G_3 + 4 \times G_4 + G_5)/16$ $B'_1 = (B_3 + 4 \times B_4 + 6 \times B_5 + 4 \times B_6 + B_7)/16$ $G'_2 = (G_6 + 4 \times G_7 + 6 \times G_8 + 4 \times G_9 + G_{10})/16$ $B'_2 = (B_8 + 4 \times B_9 + 6 \times B_{10} + 4 \times B_{11} + B_{12})/16$

AFTER REDUCTION: G'₁ B'₁ G'₂ B'₂

IMAGE CAPTURE APPARATUS, METHOD OF CONTROLLING THE SAME, AND PROGRAM

BACKGROUND OF THE INVENTION

1. Field of the Invention

The present invention relates to a noise reduction technique in an image capture apparatus that includes an image sensor.

2. Description of the Related Art

Recently, image sensors mounted on electronic cameras such as digital cameras have tended to reduce the amount of accumulated charge per pixel due to a reduction in size as well as an increase in the number of pixels. In order to maintain the sensitivity at the same level as in conventional image sensors, compensation must be performed by amplifying a signal obtained when reading out accumulated charges. Since noise components are also amplified during signal amplification, random noise becomes larger than before, resulting in a degradation in the S/N ratio. Because the sensitivity is raised in order to widen the range of conditions suitable for image capture, noise reduction techniques are becoming more important than ever.

A method often used in the noise reduction technique for a single captured image is known to perform low-pass filter processing using a two-dimensional filter, as in, for example, Japanese Patent Laid-Open No. 11-041491. The output value of a pixel of interest is obtained by adding and averaging the output values of peripheral pixels for which the absolute value of the difference from the pixel output value of the pixel of interest is less than or equal to a predetermined threshold. This processing allows a reduction in random noise having an amplitude less than or equal to the predetermined threshold. On the other hand, an object edge portion or the like with an amplitude larger than the predetermined threshold remains unchanged. This minimizes degradation in the feeling of resolution. However, the predetermined threshold must be set large to cope with random noise of a relatively large amplitude. This makes the random noise indistinguishable from an object edge with a small amplitude. For this reason, although the noise reduction effect is enhanced, the feeling of resolution is lost. As the number of taps of the filter increases, the number of pixels to be subjected to addition and averaging increases. Hence, although the noise reduction effect is enhanced, circuit scale is increased.

To solve the above-described problems, for example, Japanese Patent Laid-Open No. 2007-329905 proposes an arrangement for performing noise reduction processing using image data read out from an image sensor in two image reading modes, that is, low and high resolution modes.

Japanese Patent Laid-Open No. 2001-057677 proposes an arrangement which performs noise reduction processing by reducing an original image to generate a reduced image having a resolution lower than that of the original image, enlarging the reduced image to the size of the original image, and then compositing the enlarged image with the original image.

These techniques make it possible to attain a high random noise reduction effect and a high-resolution still image with a simple arrangement.

In Japanese Patent Laid-Open No. 2007-329905, switching between the two driving modes is performed. When capturing an image of a moving object, it is difficult to acquire images of the same object at the same angle of view in the two driving modes.

In Japanese Patent Laid-Open No. 2001-057677, to execute the above-described composition processing directly using RGB signals generated by the image sensor, it is necessary to generate three RGB color planes to generate a reduced image of arbitrary size. To do this, memory usage is greatly increased during the noise reduction processing. In order to prevent such an increase in memory usage, the composite processing is performed after converting RGB signals into YUV signals. Conversion to YUV signals enables the occupied area of the memory to be made smaller than in the arrangement for generating three RGB color planes.

However, if, for example, the YUV signals after noise reduction processing have the YUV 422 data structure, they include two luminance signals (Y) and two chrominance signals (U, V), that is, a total of four signals for two pixels. For this reason, if the number of bits of the RGB signals generated by the image sensor equals that of the YUV signals, the occupied area of the memory is doubled. That is, the memory area occupied for composition processing is increased.

SUMMARY OF THE INVENTION

The present invention has been made in consideration of the above-described problems, and enables effective noise reduction while minimizing the circuit scale and the occupied memory area in an image capture apparatus including a noise reduction unit which performs low-pass filter processing using a two-dimensional filter.

According to the first aspect of the present invention, there is provided an image capture apparatus comprising: an image capture unit, including an image sensor in which pixels for photoelectrically converting an object image are two-dimensionally arrayed in correspondence with color filters of a plurality of colors, configured to generate an image signal; a reducing unit configured to reduce the image signal output from the image capture unit to generate a reduced image; an image processing unit configured to perform development processing for the reduced image to obtain a first developed image containing luminance components and color difference components and performing development processing for the image signal output from the image capture unit to obtain a second developed image containing luminance components and color difference components; an enlargement unit configured to enlarge the first developed image to the same size as that of the second developed image; a composition unit configured to perform composition of the second developed image and an enlarged image enlarged by the enlargement unit; and a storage unit configured to store the image signal output from the image capture unit, the reduced image, the first developed image, the second developed image, and the enlarged image, wherein the image processing unit performs the development processing for a partial region of the image signal output from the image capture unit to obtain the second developed image corresponding to the partial region, and after the composition unit has composited the second developed image corresponding to the partial region with the enlarged image corresponding to the partial region, performs the development processing for a remaining region of the image signal output from the image capture unit to obtain the second developed image corresponding to the remaining region.

According to the second aspect of the present invention, there is provided a method of controlling an image capture apparatus comprising an image capture unit, including an image sensor in which pixels for photoelectrically converting an object image are two-dimensionally arrayed in correspondence with color filters of a plurality of colors, configured to generate an image signal, comprising: the reducing step of reducing the image signal output from the image capture unit to generate a reduced image; the image processing step of performing development processing for the reduced image to obtain a first developed image containing luminance components and color difference components and performing development processing for the image signal output from the image capture unit to obtain a second developed image containing luminance components and color difference components; the enlargement step of enlarging the first developed image to the same size as that of the second developed image; the composition step of performing composition of the second developed image and an enlarged image enlarged in the enlargement step; and the storage step of storing, in a storage unit, the image signal output from the image capture unit, the reduced image, the first developed image, the second developed image, and the enlarged image, wherein in the image processing step, the development processing is performed for a partial region of the image signal output from the image capture unit to obtain the second developed image corresponding to the partial region, and after the second developed image corresponding to the partial region has been composited with the enlarged image corresponding to the partial region in the composition step, the development processing is performed for a remaining region of the image signal output from the image capture unit to obtain the second developed image corresponding to the remaining region.

Further features of the present invention will become apparent from the following description of exemplary embodiments with reference to the attached drawings.

BRIEF DESCRIPTION OF THE DRAWINGS

FIG. 5 is a table which sets a gain in composition processing for each image capture sensitivity; and FIGS. 6A to 6D are explanatory views of reduction processing.

DESCRIPTION OF THE EMBODIMENTS

An embodiment of the present invention will now be described in detail with reference to the accompanying drawings.

In this embodiment, an image sensor 103 is a common CCD or CMOS sensor in which pixels having color filters of a plurality of colors in the Bayer matrix are two-dimensionally arrayed. The format of an image developed by an image processing unit 108 is the YUV 422 data structure. In the YUV 422 data structure, each pixel independently gives luminance (Y), and adjacent pixels share data of the color difference (U) between the luminance and a blue component and the color difference (V) between the luminance and a red component.

Figure 1:
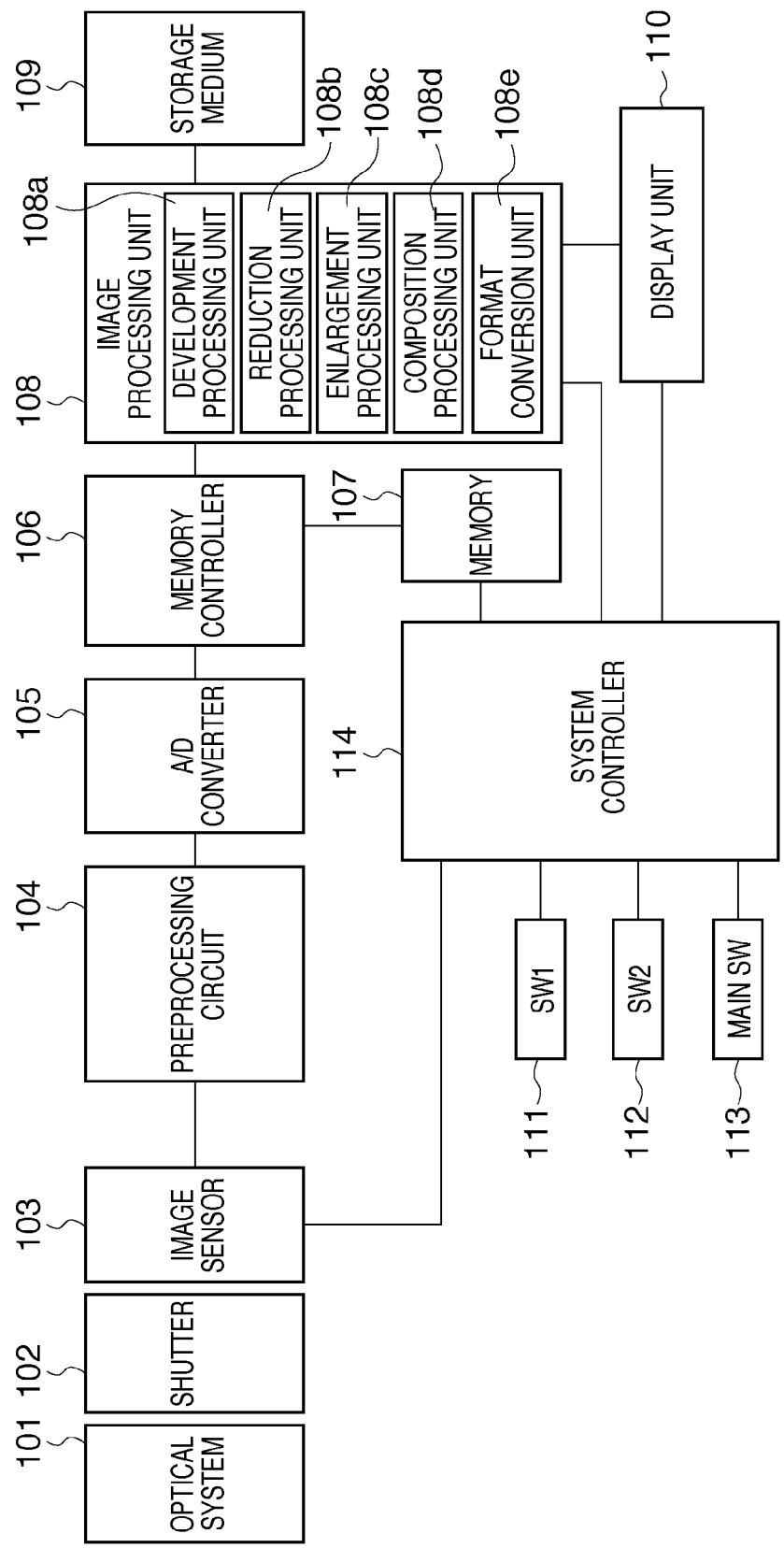
FIG. 1 is a block diagram showing the schematic arrangement of an embodiment of a digital camera to which the present invention is applied.

FIG. 1 is a block diagram showing the schematic arrangement of an embodiment of a digital camera (image capture apparatus) to which the present invention is applied.

In the digital camera according to the embodiment, the image sensor 103 photoelectrically converts an object image formed via an optical system 101 and a shutter 102, thereby generating an image signal. A preprocessing circuit 104 including a CDS circuit and a nonlinear amplification circuit (neither is shown) removes output noise from the photoelectrically converted image signal. An A/D converter 105 digitizes the image signal. A memory controller 106 stores the image signal in a memory 107. The image processing unit 108 performs noise reduction processing and development processing for the RGB signals read out from the memory 107 to obtain YUV signals (a developed image). The image processing unit 108 also converts the image format and stores the image in a storage medium 109. The image processing unit 108 executes the noise reduction processing by the above-described low-pass filter processing using a two-dimensional filter. Note that a display unit 110 displays a captured image, camera state information, and the like. A switch 111 (to be referred to as SW1 hereinafter) is used to instruct a preparation operation for image capture such as AE (automatic exposure control) processing or AF (automatic focus control) processing. An image capture switch 112 (to be referred to as SW2 hereinafter) is used to instruct the start of image capture after the operation of the switch SW1. A main switch 113 (to be referred to as a main SW hereinafter) is used to power-on the digital camera. A system controller 114 controls the operation of the overall digital camera. The image processing unit 108 includes a development processing unit 108a, reduction processing unit 108b, enlargement processing unit 108c, composition processing unit 108d, and format conversion unit 108e.

Figure 2:
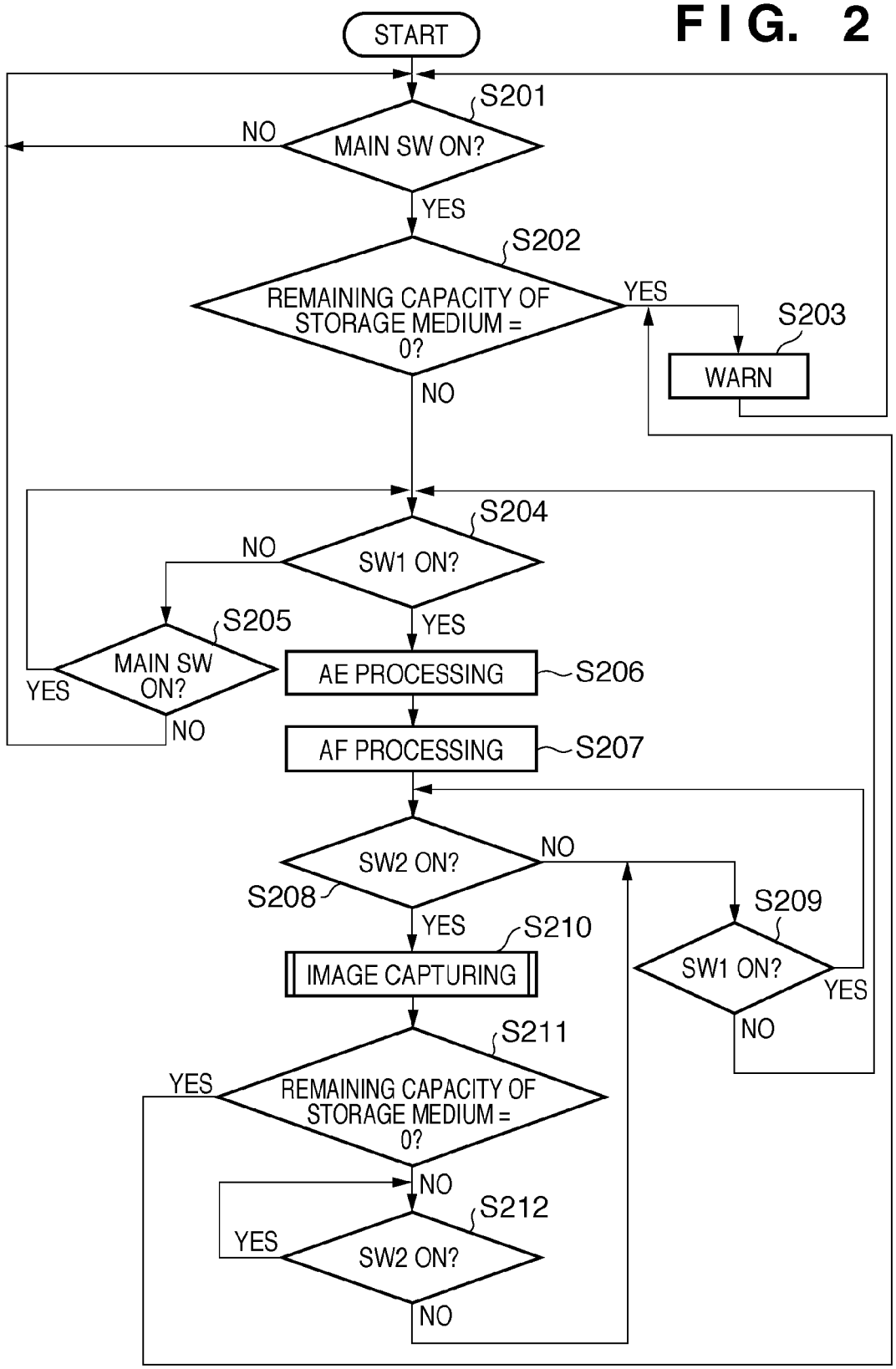
FIG. 2 is a flowchart of the image capture operation of the digital camera according to the embodiment.

The operation of the digital camera according to the embodiment will be explained below in detail with reference to FIG. 2. FIG. 2 is a flowchart illustrating the image capture operation of the digital camera according to the embodiment.

In step S201, the system controller 114 detects the state of the main SW 113 for powering on the digital camera. If the main SW 113 is ON, the process advances to step S202. In step S202, the system controller 114 checks the remaining capacity of the storage medium 109. If the remaining capacity is 0, the process advances to step S203. Otherwise, the process advances to step S204. In step S203, the system controller 114 causes the display unit 110 to display a warning indicating that the remaining capacity of the storage medium 109 is 0, and the process returns to step S201.

In step S204, the system controller 114 checks the state of the switch SW1 111. If the switch SW1 111 is ON, the process advances to step S206. Otherwise, the process advances to step S205. In step S205, the system controller 114 checks the state of the main SW 113. If the main SW 113 is ON, the process returns to step S204. Otherwise, the process returns to step S201. In step S206, the system controller 114 performs AE processing to determine the exposure condition based on the set image capture mode, shutter speed, and sensitivity. In step S207, the system controller 114 performs AF processing.

In step S208, the system controller 114 checks the state of the switch SW2 112. If the switch SW2 112 is ON, the process advances to step S210. Otherwise, the process advances to step S209. In step S209, the system controller 114 checks the state of the switch SW1 111. If the switch SW1 111 is ON, the process returns to step S208. Otherwise, the process returns to step S204. In step S210, the system controller 114 performs an image capture operation in accordance with the flowchart in FIG. 3 to be described later. In step S211, the system controller 114 checks the remaining capacity of the storage medium 109 after the image capture operation. If the remaining capacity is 0 or almost 0, the process advances to step S203. Otherwise, the process advances to step S212. In step S212, the system controller 114 checks the state of the switch SW2 112. If the switch SW2 112 is not ON, the process advances to step S209.

Figure 3:
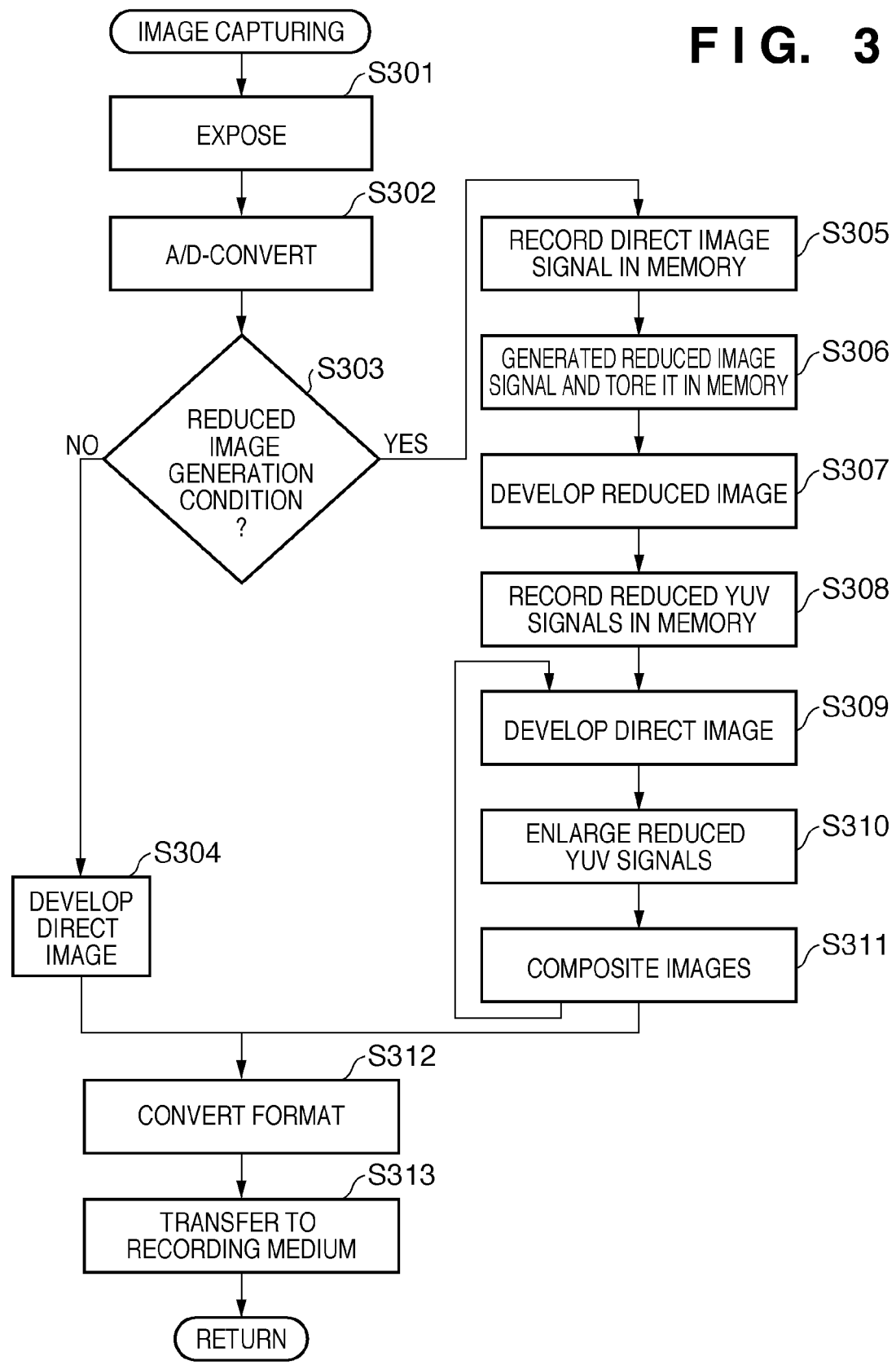
FIG. 3 is a flowchart of the subroutine of image capture in FIG. 2.

The subroutine of image capture in step S210 of the flowchart shown in FIG. 2 will be described below with reference to the flowchart in FIG. 3. FIG. 3 is a flowchart of the subroutine of image capture (step S210) in the flowchart of FIG. 2.

In step S301, the system controller 114 performs exposure of the image sensor 103 in accordance with an exposure condition determined by the AE processing (step S206) in the flowchart of FIG. 2. An object image formed on the image sensor is photoelectrically converted into an analog image signal. In step S302, the signal is sent to the A/D converter 105 and converted into a digital image signal.

In step S303, if the sensitivity set at the time of exposure, that is, image capture in step S301 is equal to or lower than a predetermined sensitivity set in advance, the process advances to step S304. Otherwise, the process advances to step S305. Note that the predetermined sensitivity is set to, for example, ISO 100 or ISO 200, that is, an image capture sensitivity at which no strong noise reduction effect is necessary because the noise level is relatively low.

In step S304, the image processing unit 108 develops the image signal output from the A/D converter 105. More specifically, the image processing unit 108 adjusts the gain of RGB signals by white balance processing, generates three RGB color planes by color interpolation processing, and adjusts hue by masking processing. In the RGB color planes after the color interpolation processing, noise reduction processing is executed by low-pass filter processing using a two-dimensional filter. As described above, this noise reduction processing obtains the output value of a pixel of interest by adding and averaging the output values of peripheral pixels for which the absolute value of the difference from the pixel output value of the pixel of interest is less than or equal to a predetermined threshold, thereby reducing random noise having an amplitude less than or equal to the predetermined threshold. In addition, gamma conversion processing is executed to perform processes necessary for displaying the image on the display or the like. The RGB signals are converted into YUV signals including the luminance (Y), the color difference (U) of the blue component, and the color difference (V) of the red component and stored in the memory 107.

In this case, the RGB signals are converted into YUV signals by, for example, $$Y = 0.299 \times R + 0.587 \times G + 0.114 \times B \quad (1)$$

$$U = -0.169 \times R - 0.331 \times G + 0.500 \times B \quad (2)$$

$$V = 0.500 \times R - 0.419 \times G - 0.081 \times B \quad (3)$$

Figure 4:
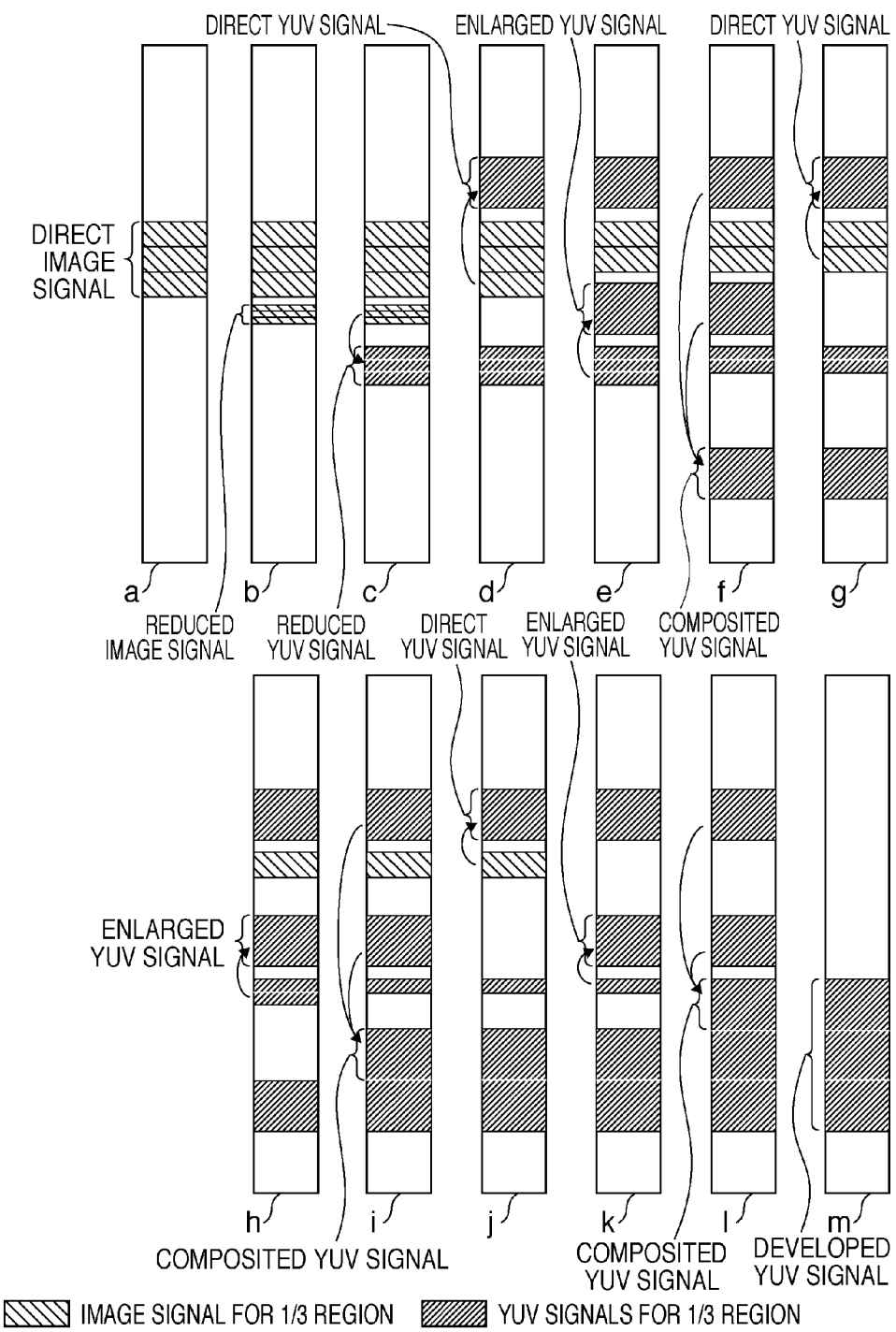
FIG. 4 is a view schematically showing the occupied states of a memory.

Steps S305 to S311 represent processing which is executed when it is determined in step S303 that the image has been captured at an image capture sensitivity higher than the predetermined sensitivity, and noise reduction processing stronger than that in the development processing of step S304 is necessary. FIG. 4 is a view schematically showing the occupied states of a memory in steps S305 to S311.

As will be described later, in the processes of steps S309 to S311, an image is divided into a plurality of regions, and each divided region is processed, thereby making the occupied memory area small. In this embodiment to be explained below, the whole image region is divided into three parts and processed. An image signal obtained from the image sensor having color filters in the Bayer matrix includes one image signal per pixel. However, when a developed image has the YUV 422 format, as in this embodiment, the image includes two luminance signals (Y) and two chrominance signals (U, V), that is, a total of four signals for two pixels. For this reason, if the number of bits does not change, the necessary capacity doubles. As a measure, this embodiment minimizes the occupied memory area by making the amount of YUV signals simultaneously stored in the memory as small as possible by division processing.

Note that the image size obtained by the image sensor 103 will be referred to as direct size, and the image size after reduction processing of the reduction processing unit in the image processing unit 108 to be described later will be referred to as reduced size hereinafter.

In step S305, the memory controller 106 stores, in the memory 107, the image signal of direct size output from the A/D converter 105 (a in FIG. 4).

In step S306, the reduction processing unit 108b in the image processing unit 108 reads out the direct-size image signal recorded in the memory 107 in step S305, reduces the image size to generate an image signal of reduced size, and stores it in the memory 107 (b in FIG. 4).

The reduction processing is executed by, for example, the method shown in FIGS. 6A and 6B. FIG. 6A shows ⅓ reduction processing of a horizontal line of color filters R-G. FIG. 6B shows ⅓ reduction processing of a horizontal line of color filters G-B.

First, addition and averaging with weights of [1, 2, 1] is performed for three adjacent pixels of the same color while skipping two pixels, thereby obtaining an image signal reduced to ⅓ in the horizontal direction. Then, based on the image signal reduced to ⅓ in the horizontal direction, an image signal reduced to ⅓ in the vertical direction is obtained by the same calculation.

In step S307, the development processing unit 108a in the image processing unit 108 develops the reduced-size image signal obtained by the reduction processing in step S306, thereby obtaining YUV signals of reduced size (first developed image). In step S308, the memory controller 106 stores the reduced-size YUV signals in the memory 107 (c in FIG. 4).

In step S309, the development processing unit 108a in the image processing unit 108 develops one divided region of the direct-size image signal stored in the memory 107 in step S305. Direct-size YUV signals of one divided region (second developed image) are thus obtained (d in FIG. 4).

In the development processing of step S307, noise reduction processing by low-pass filter processing using a two-dimensional filter is performed strongly as compared to the development processing of step S309. More specifically, a first threshold for random noise reduction by the low-pass filter processing in step S307 is set to be larger than a second threshold for random noise reduction in step S309, thereby executing stronger noise reduction processing.

Namely, the random noise reduction processing by addition and averaging of the pixel output values of the pixel of interest and peripheral pixels is performed not in the development processing of the direct-size image signal but in the development processing of the reduced-size image signal depending on the pixel output value differences between the pixel of interest and the peripheral pixels.

More specifically, direct image development is performed based on a threshold which is set not to cause any omission of fine edge information of the object image. In reduced image development, however, the threshold is set to reduce random noise as much as possible together with weighted addition and averaging at the time of reduction processing. Hence, for high-sensitivity image capture where the noise level rises, the threshold is set to be, for example, about 1.5 times larger than that for a direct image.

Note that the strength of the noise reduction processing in the development processing of step S304 is almost the same as that of the noise reduction processing in the development processing of step S309.

In step S310, the enlargement processing unit 108c in the image processing unit 108 reads out, from the memory 107, reduced-size YUV signals corresponding to the divided region developed in step S309. The enlargement processing unit 108c then enlarges the signals to the same size as the direct-size YUV signals developed in step S309 (e in FIG. 4). The enlargement processing of obtaining the enlarged image is performed using, for example, the interpolation method described in Japanese Patent Laid-Open No. 11-053531, and a description thereof will be omitted here.

In step S311, the composition processing unit 108d in the image processing unit 108 composites the YUV image enlarged in step S310 and the direct-size YUV image developed in step S309. The composition processing unit 108d stores the obtained composited YUV signals (composite image) in the memory 107 via the memory controller 106 (f in FIG. 4).

The composition processing is performed by weighted composition. However, if the images are directly added, each signal value doubles, resulting in an overexposed image. To prevent this, the two composition target images are multiplied by gains that add up to 1 before the composition processing and then added. This allows an image to be obtained that is of the same exposure as that before composition. The composition ratio is decided by the gain settings. The gain values change in accordance with the image capture sensitivity, as shown in FIG. 5. For the luminance component and the color difference components, the composition ratio is changed by changing the gain settings. The composition ratio set here influences the quality of the composite image. This will be described later.

As described above, one (partial) divided region is processed in steps S309 to S311. Hence, the processes in steps S309 to S311 are repeatedly performed as many times as the division of the image region, thereby obtaining the developed YUV signals of the entire image (g to m in FIG. 4).

In step S312, the format conversion unit 108e in the image processing unit 108 converts the image format of the developed YUV signals stored in the memory 107 in step S304 or S311 into, for example, JPEG format. In step S313, the image is transferred to the storage medium 109 and stored. Note that the image obtained in step S304 is equivalent to an image obtained by causing the composition processing unit 108d to set the composition ratio of the YUV image enlarged in step S310 to 0.

As described above, in this embodiment, the image of a direct-size image signal and the image of a reduced-size image signal are both divided into a plurality of regions. Processing to generate YUV signals from each of the direct-size image signal and the reduced-size image signal and composite them after equalizing their sizes is sequentially performed for each divided region while changing the timing. For this reason, the direct-size YUV signals generated from the direct image signal are stored in the memory at different timings for the respective divided regions. The direct-size YUV signals corresponding to the whole image region never exist in the memory simultaneously before completion of composition processing. It is therefore possible to minimize the circuit scale and the occupied memory area.

Note that in this embodiment, the reduced-size YUV signals of the entire image region are obtained at once by developing the reduced-size image signal of the entire image region. Instead, the reduced-size YUV signals may be obtained from the reduced-size image signal at different timings for the respective regions, like the direct-size YUV signals.

Noise reduction means that employ low-pass filter processing using a two-dimensional filter degrade the feeling of resolution if the noise reduction strength is set to be high. Additionally, the noise reduction effect is limited by the number of filter taps.

In this embodiment, however, the final developed image is obtained by compositing enlarged YUV signals with a strong noise reduction effect and direct-size YUV signals which maintain the feeling of resolution. The enlarged YUV signals lose the feeling of resolution because of the reduction processing and enlargement processing. However, the effect of noise reduction processing is obtained against noise of a lower frequency even when the number of filter taps does not change. The noise reduction processing is therefore especially effective for noise of color components. The embodiment provides for enlarged YUV signals that place emphasis on noise reduction by setting strong noise reduction processing and direct-size YUV signals with a focus on keeping the feeling of resolution. In the composition processing, the composition ratio is set for each of the luminance component and color difference components while balancing the feeling of resolution and noise reduction effect. As shown in FIG. 5, for color components that do not largely affect the degradation in the feeling of resolution, the composition ratio of the enlarged YUV signals is set to be higher than that of the luminance component.

At a low sensitivity, the noise amount is small. For this reason, the composition processing which degrades the feeling of resolution is not performed, or the composition ratio of the enlarged image is set at 0.

Conversely, noise reduction by low-pass filter processing may be prevented at a low sensitivity, although YUV signals obtained by enlarging the reduced-size YUV signals are composited with the direct-size YUV signals. As described above, the enlarged YUV signals lose the feeling of resolution because of the reduction processing and enlargement processing. However, weighted composition of the enlarged YUV signals and the direct-size YUV signals enables an effect to be obtained similar to the effect of low-pass filter processing of the direct-size YUV signals.

Note that in the above-described embodiment, the reduction ratio of reduction processing in step S306 of the flowchart in FIG. 3 is set to $1/3$. However, the reduction ratio is not limited to $1/3$.

The reduction ratio can also be changed based on the set value of the image capture sensitivity. For example, as shown in FIGS. 6C and 6D, addition and averaging with weights of [1, 4, 6, 4, 1] is performed for five adjacent pixels of the same color while skipping four pixels, thereby obtaining an image signal reduced to $1/6$. The higher reduction ratio enables more effective averaging and yields a higher noise reduction effect. For this reason, it is also effective to set reduction processing to $1/3$ at an image capture sensitivity of, for example, ISO 400 or ISO 800 and reduction processing to $1/6$ at ISO 1600.

Not only at an image capture sensitivity higher than the predetermined sensitivity but also at any other image capture sensitivity, YUV signals obtained by enlarging reduced-size YUV signals may be composited with direct-size YUV signals.

In the above-described embodiment, the image sensor is a CCD or CMOS sensor including color filters in the Bayer matrix. However, the present invention is not limited to this. The image format after development processing is the YUV 422 data structure. Instead, either the YUV 411 data structure or the YUV 444 data structure is usable.

When developing an image, the image region is divided into three parts. However, the present invention is not limited to this. Caution must be taken not to make the number of divided regions too large because overlap processing prolongs the process time.

As described above, according to the image capture apparatus of the embodiment, it is possible to obtain a stronger noise reduction effect and simultaneously avoid any degradation in performance such as continuous shooting performance while minimizing the circuit scale and the occupied memory area.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-022964, filed Feb. 3, 2009 and 2009-282224, filed Dec. 11, 2009, which are hereby incorporated by reference herein in their entirety.

What is claimed is:

1. An image capture apparatus comprising:
    an image capture unit, including an image sensor in which pixels for photoelectrically converting an object image are two-dimensionally arrayed in correspondence with color filters of a plurality of colors, configured to generate an image signal;
    a reducing unit configured to reduce the image signal output from the image capture unit to generate a reduced image;
    an image processing unit configured to perform development processing for the reduced image to obtain a first developed image containing luminance components and color difference components and performing development processing for the image signal output from the image capture unit to obtain a second developed image containing luminance components and color difference components;
    an enlargement unit configured to enlarge the first developed image to the same size as that of the second developed image;
    a composition unit configured to perform composition of the second developed image and an enlarged image enlarged by the enlargement unit; and
    a storage unit configured to store the image signal output from the image capture unit, the reduced image, the first developed image, the second developed image, and the enlarged image, wherein the image processing unit performs the development processing for a partial region of the image signal output from the image capture unit to obtain the second developed image corresponding to the partial region, and after the composition unit has composited the second developed image corresponding to the partial region with the enlarged image corresponding to the partial region, performs the development processing for a remaining region of the image signal output from the image capture unit to obtain the second developed image corresponding to the remaining region.

2. The apparatus according to claim 1, wherein the image processing unit performs first noise reduction processing and the development processing for the reduced image to obtain the first developed image including the luminance components and the color difference components and performs second noise reduction processing and the development processing for the image signal output from the image capture unit to obtain the second developed image including the luminance components and the color difference components.

3. The apparatus according to claim 2, wherein the second noise reduction processing is weaker than the first noise reduction processing.

4. The apparatus according to claim 1, wherein when a sensitivity during image capture is not more than a predetermined sensitivity, the composition unit sets a composition ratio of the enlarged image with respect to the second developed image at zero or outputs only the second developed image as a composite image.

5. The apparatus according to claim 1, wherein when a sensitivity during image capture is not more than a predetermined sensitivity, the image processing unit generates only the second developed image without performing reduction processing by the reducing unit and enlargement processing by the enlargement unit, and the composition unit does not execute composition processing.

6. The apparatus according to claim 1, wherein a reduction ratio of the reducing unit is changed in accordance with a set value of the sensitivity upon image capture.

7. The apparatus according to claim 1, wherein the composition ratio of the enlarged image and the second developed image by the composition unit is changed between the luminance component and the color difference component of the image signal and also changed in accordance with the set value of the sensitivity upon image capture.

8. The apparatus according to claim 1, wherein the image processing unit, the enlargement unit, and the composition unit perform processing after dividing a process target image into a plurality of regions.

9. A method of controlling an image capture apparatus comprising an image capture unit, including an image sensor in which pixels for photoelectrically converting an object image are two-dimensionally arrayed in correspondence with color filters of a plurality of colors, configured to generate an image signal, comprising:
    a reducing step of reducing the image signal output from the image capture unit to generate a reduced image;
    an image processing step of performing development processing for the reduced image to obtain a first developed image containing luminance components and color difference components and performing development processing for the image signal output from the image capture unit to obtain a second developed image containing luminance components and color difference components;
    an enlargement step of enlarging the first developed image to the same size as that of the second developed image;

a composition step of performing composition of the second developed image and an enlarged image enlarged in the enlargement step; and a storage step of storing, in a storage unit, the image signal output from the image capture unit, the reduced image, the first developed image, the second developed image, and the enlarged image, wherein in the image processing step, the development processing is performed for a partial region of the image signal output from the image capture unit to obtain the second developed image corresponding to the partial region, and after the second developed image corresponding to the partial region has been composited with the enlarged image corresponding to the partial region in the composition step, the development processing is performed for a remaining region of the image signal output from the image capture unit to obtain the second developed image corresponding to the remaining region.

10. A non-transitory computer readable storage medium storing a program which causes a computer to execute a method of controlling an image capture apparatus according to claim 9.

* * * * *